US011543967B2

United States Patent
Kachare et al.

(10) Patent No.: US 11,543,967 B2
(45) Date of Patent: Jan. 3, 2023

(54) METHOD FOR CONTROLLING BW SLA IN NVME-OF ETHERNET SSD STORAGE SYSTEMS

(71) Applicant: Samsung Electronics Co., Ltd., Suwon-si (KR)

(72) Inventors: Ramdas P. Kachare, Cupertino, CA (US); Sompong Paul Olarig, Pleasanton, CA (US); Son T. Pham, San Ramon, CA (US)

(73) Assignee: SAMSUNG ELECTRONICS CO., LTD.

( * ) Notice: Subject to any disclaimer, the term of this patent is extended or adjusted under 35 U.S.C. 154(b) by 10 days.

(21) Appl. No.: 15/487,431

(22) Filed: Apr. 13, 2017

(65) Prior Publication Data
US 2018/0239540 A1    Aug. 23, 2018

Related U.S. Application Data

(60) Provisional application No. 62/462,901, filed on Feb. 23, 2017.

(51) Int. Cl.
*G06F 3/06*      (2006.01)
*G06F 13/40*     (2006.01)
(Continued)

(52) U.S. Cl.
CPC ............ *G06F 3/0611* (2013.01); *G06F 3/067* (2013.01); *G06F 3/0635* (2013.01);
(Continued)

(58) Field of Classification Search
CPC ...... G06F 3/0611; G06F 3/0635; G06F 3/067; G06F 3/0688; G06F 13/0422;
(Continued)

(56) References Cited

U.S. PATENT DOCUMENTS 7,133,363 B2   11/2006   Takase et al.
7,260,634 B2    8/2007   Furukawa et al.
(Continued)

FOREIGN PATENT DOCUMENTS

JP    2004048124 A    2/2004
JP    2005204092 A    7/2005
(Continued)

OTHER PUBLICATIONS

Hoshino, Tomonori, "NVMe Realization of High Performance, High Expansion, High Available Database System Using Flash Storage~ Leverage ExpEther Technology," NEC Corporation, Japan Electric Co., Ltd., System Platform and Business Unit IoT-based Development Headquarters, retrieved: (https://pdfslide.net/technology/db-tech-showcase-tokyo-2016-d13-nvme.html?page=14), Jul. 13, 2016, 55 pages.

(Continued)

*Primary Examiner* — Muhammad Raza
(74) *Attorney, Agent, or Firm* — Renaissance IP Law Group LLP

(57) ABSTRACT

An Ethernet solid-state drive (eSSD) system includes a plurality of eSSDs, an Ethernet switch and a baseboard management controller. The Ethernet switch is coupled to each of the eSSDs, and the baseboard management controller is coupled to the each of the eSSDs and to the Ethernet switch. The baseboard management controller controls the Ethernet switch to provide to each eSSD a corresponding predetermined bandwidth that is based on bandwidth information for the eSSD that is stored in a policy table of the baseboard management controller. The at least one predetermined bandwidth may include a predetermined ingress bandwidth and a predetermined egress bandwidth for the corresponding eSSD. The at least one predetermined bandwidth may be based on a service level associated with the (Continued)

corresponding eSSD, and may be adaptively based on operating parameters of the corresponding eSSD.

14 Claims, 4 Drawing Sheets

(51) Int. Cl.
*G06F 13/42* (2006.01)
*H04L 29/08* (2006.01)
*H04L 12/24* (2006.01)
*H04L 41/0893* (2022.01)
*H04L 41/0896* (2022.01)
*H04L 67/1097* (2022.01)

(52) U.S. Cl.
CPC ........ *G06F 3/0688* (2013.01); *G06F 13/4022* (2013.01); *G06F 13/4282* (2013.01); *G06F 13/4295* (2013.01); *H04L 41/0893* (2013.01); *H04L 41/0896* (2013.01); *G06F 3/061* (2013.01); *G06F 2213/0026* (2013.01); *H04L 67/1097* (2013.01)

(58) Field of Classification Search
CPC ............. G06F 13/4282; G06F 13/4295; G06F 2213/0026; G06F 3/061; G06F 5/12; G06F 3/0625; G06F 3/0631; G06F 3/0659; H04L 41/0893; H04L 41/0896; H04L 67/1097; H04L 47/30
USPC ................................ 709/213; 711/163, 167
See application file for complete search history.

(56) References Cited

U.S. PATENT DOCUMENTS

| | | | | |
|---|---|---|---|---|
| 8,174,969 B1 * | 5/2012 | Kommidi | | H04L 49/50 370/229 |
| 8,370,570 B2 * | 2/2013 | Motonaga | | G06F 3/0679 711/114 |
| 8,543,685 B1 * | 9/2013 | Gormley | | H04L 47/762 709/224 |
| 8,972,611 B2 * | 3/2015 | Galles | | H04L 29/00 709/232 |
| 9,094,302 B2 * | 7/2015 | Nguyen | | H04L 41/5025 |
| 9,210,048 B1 | 12/2015 | Marr et al. | | |
| 9,363,315 B2 * | 6/2016 | Danilak | | H04L 67/1097 |
| 9,396,755 B2 | 7/2016 | Budiman et al. | | |
| 9,565,269 B2 * | 2/2017 | Malwankar | | H04L 67/2842 |
| 9,619,164 B2 * | 4/2017 | Mehta | | G06F 3/0626 |
| 9,857,995 B1 * | 1/2018 | Malina | | G06F 3/0619 |
| 10,114,778 B2 | 10/2018 | Worley et al. | | |
| 2008/0165777 A1 | 7/2008 | Gainey et al. | | |
| 2009/0010279 A1 * | 1/2009 | Tsang | | H04L 47/22 370/468 |
| 2009/0303883 A1 * | 12/2009 | Kucharczyk | | H04L 49/254 370/241 |
| 2010/0189064 A1 | 7/2010 | Raveendran | | |
| 2010/0198965 A1 | 8/2010 | Tanaka | | |
| 2013/0275568 A1 * | 10/2013 | Nguyen | | H04L 41/0806 709/223 |
| 2013/0311696 A1 | 11/2013 | Huff et al. | | |
| 2014/0195634 A1 * | 7/2014 | Kishore | | H04L 67/1097 709/213 |
| 2014/0337598 A1 * | 11/2014 | Rao | | G06F 3/0613 711/167 |
| 2015/0120874 A1 | 4/2015 | Kim et al. | | |
| 2015/0331473 A1 | 11/2015 | Jreji et al. | | |
| 2015/0347330 A1 * | 12/2015 | Vaishampayan | ... | G05D 23/1917 710/60 |
| 2015/0363220 A1 * | 12/2015 | Yamada | | G06F 3/0613 711/114 |
| 2015/0378640 A1 * | 12/2015 | Huang | | G06F 3/0661 709/217 |
| 2016/0048329 A1 | 2/2016 | Chang et al. | | |
| 2016/0050470 A1 * | 2/2016 | Swinkels | | H04L 41/04 398/45 |
| 2016/0066070 A1 * | 3/2016 | Trausch | | H04Q 11/0003 398/45 |
| 2016/0085718 A1 | 3/2016 | Huang | | |
| 2016/0092257 A1 * | 3/2016 | Wang | | G06F 9/45558 718/1 |
| 2016/0094450 A1 * | 3/2016 | Ghanwani | | H04L 47/22 370/235 |
| 2016/0117105 A1 * | 4/2016 | Thangaraj | | G06F 3/0625 711/103 |
| 2016/0127492 A1 * | 5/2016 | Malwankar | | G06F 3/0614 709/212 |
| 2016/0182389 A1 * | 6/2016 | Hernandez | | G06F 5/12 370/236 |
| 2016/0334846 A1 * | 11/2016 | Donlin | | G06F 1/266 |
| 2016/0334992 A1 | 11/2016 | Yashiro | | |
| 2016/0349812 A1 * | 12/2016 | Goh | | G06F 1/206 |
| 2017/0017585 A1 * | 1/2017 | Iyer | | G06F 13/4282 |
| 2017/0046097 A1 * | 2/2017 | Jayaraman | | G06F 3/0653 |
| 2017/0048107 A1 * | 2/2017 | Dosovitsky | | H04L 43/16 |
| 2017/0078348 A1 * | 3/2017 | McGinnity | | H04N 21/23418 |
| 2017/0195237 A1 * | 7/2017 | Parasmal | | H04L 12/2869 |
| 2018/0007455 A1 * | 1/2018 | Mehrvar | | H04Q 11/0062 |
| 2018/0026893 A1 * | 1/2018 | Jeuk | | H04L 47/20 370/236 |
| 2018/0063019 A1 * | 3/2018 | Martin | | H04L 43/08 |

FOREIGN PATENT DOCUMENTS

| | | |
|---|---|---|
| JP | 2007328604 A | 12/2007 |
| JP | 2014160527 A | 9/2014 |
| JP | 2016212745 A | 12/2016 |
| KR | 101344105 B1 | 12/2013 |
| KR | 20150047785 A | 5/2015 |
| KR | 20160033754 A | 3/2016 |
| KR | 20160131906 A | 11/2016 |
| WO | 2009011090 A1 | 1/2009 |
| WO | 2016196766 A2 | 12/2016 |

OTHER PUBLICATIONS

Noureddine, Wael, "NVMe over Fabrics," SDC '15, Storage Developer Conference, SNIA, Santa Clara, retrieved: (https://www.snia.org/sites/default/files/SDC15_presentations/networking/WaelNoureddine_Implementing_%20NVMe_revision.pdf), 2015, 19 pages.

* cited by examiner

| SLA Policy | eSSD-0 | eSSD-1 | eSSD-2 | | eSSD-n |
|---|---|---|---|---|---|
| Ingress B/W (Gbps) | 5 | 5 | 5 | | 5 |
| Egress B/W (Gbps) | 10 | 10 | 10 | | 10 |

| SLA Policy | eSSD-0 | eSSD-1 | eSSD-2 | | eSSD-n |
|---|---|---|---|---|---|
| Ingress B/W (Gbps) | 5 | 5 | 5 | | 5 |
| Egress B/W (Gbps) | 10 | 5 | 7.5 | | 25 |

| SLA Policy | eSSD-0 | eSSD-1 | eSSD-2 | | eSSD-n |
|---|---|---|---|---|---|
| Ingress B/W (Gbps) | 5 | 5 | 5 | | 5 |
| Egress B/W (Gbps) | 5 | 5 | 10 | | 10 |

METHOD FOR CONTROLLING BW SLA IN NVME-OF ETHERNET SSD STORAGE SYSTEMS

CROSS-REFERENCE TO RELATED APPLICATION

This patent application claims the priority benefit under 35 U.S.C. § 119(e) of U.S. Provisional Patent Application No. 62/462,901, filed on Feb. 23, 2017, the disclosure of which is incorporated herein by reference in its entirety.

TECHNICAL FIELD

The subject matter disclosed herein generally relates to storage systems, and more particularly, to a system and a method for managing bandwidth Service Level Agreements (SLAs) associated with Ethernet Solid-State Drive systems.

BACKGROUND

Ethernet SSDs (eSSDs) allow one or more remote server hosts to be connected to an eSSD through an Ethernet network in a remote Direct Attached Storage (rDAS) mode. Conventional eSSD storage systems, however, do not easily allow a bandwidth SLA to be applied to a particular eSSD in a storage system having a plurality of eSSDs.

SUMMARY

An example embodiment provides an eSSD system that may include at least one eSSD, an Ethernet switch and a controller, such as a baseboard management controller. The Ethernet switch may be coupled the at least one eSSD; and the controller may be coupled to the at least one eSSD and the Ethernet switch. The controller may control the Ethernet switch to provide a predetermined bandwidth to the at least one eSSD in which the predetermined bandwidth may be based on bandwidth information for the at least one eSSD stored in a policy table of the controller. In one embodiment, each predetermined bandwidth for the at least one eSSD may include a predetermined ingress bandwidth and a predetermined egress bandwidth for the at least one eSSD. In one embodiment, the predetermined ingress bandwidth may be different from the predetermined egress bandwidth. In another embodiment, the predetermined bandwidth may be based on a service level associated with the at least one eSSD. In still another embodiment, the predetermined bandwidth may be adaptively based on operating parameters of the at least one eSSD.

An example embodiment may provide a method to control bandwidth for an Ethernet solid-state drive (eSSD) system that may include receiving at a controller bandwidth information for at least one eSSD of a plurality of eSSDs; storing at the controller the received bandwidth information for the at least one eSSD; and configuring by the controller a bandwidth capacity of an Ethernet switch for the at least one eSSD in which the Ethernet switch may be coupled to the at least one eSSD. In one embodiment, the bandwidth capacity for the at least one eSSD may include a predetermined ingress bandwidth and a predetermined egress bandwidth for the at least one eSSD. In one embodiment, the predetermined ingress bandwidth may be different from the predetermined egress bandwidth. In one embodiment, the bandwidth capacity may be based on a service level associated with the at least one eSSD. In another embodiment, the bandwidth capacity may be adaptively based on operating parameters of the at least one eSSD.

BRIEF DESCRIPTION OF THE DRAWINGS

In the following section, the aspects of the subject matter disclosed herein will be described with reference to exemplary embodiments illustrated in the figures, in which:

FIGS. 2A-2C respectively depict example policy tables for managing and/or enforcing Ethernet ingress and egress bandwidth according to the subject matter disclosed herein;

DETAILED DESCRIPTION

Figure 1:
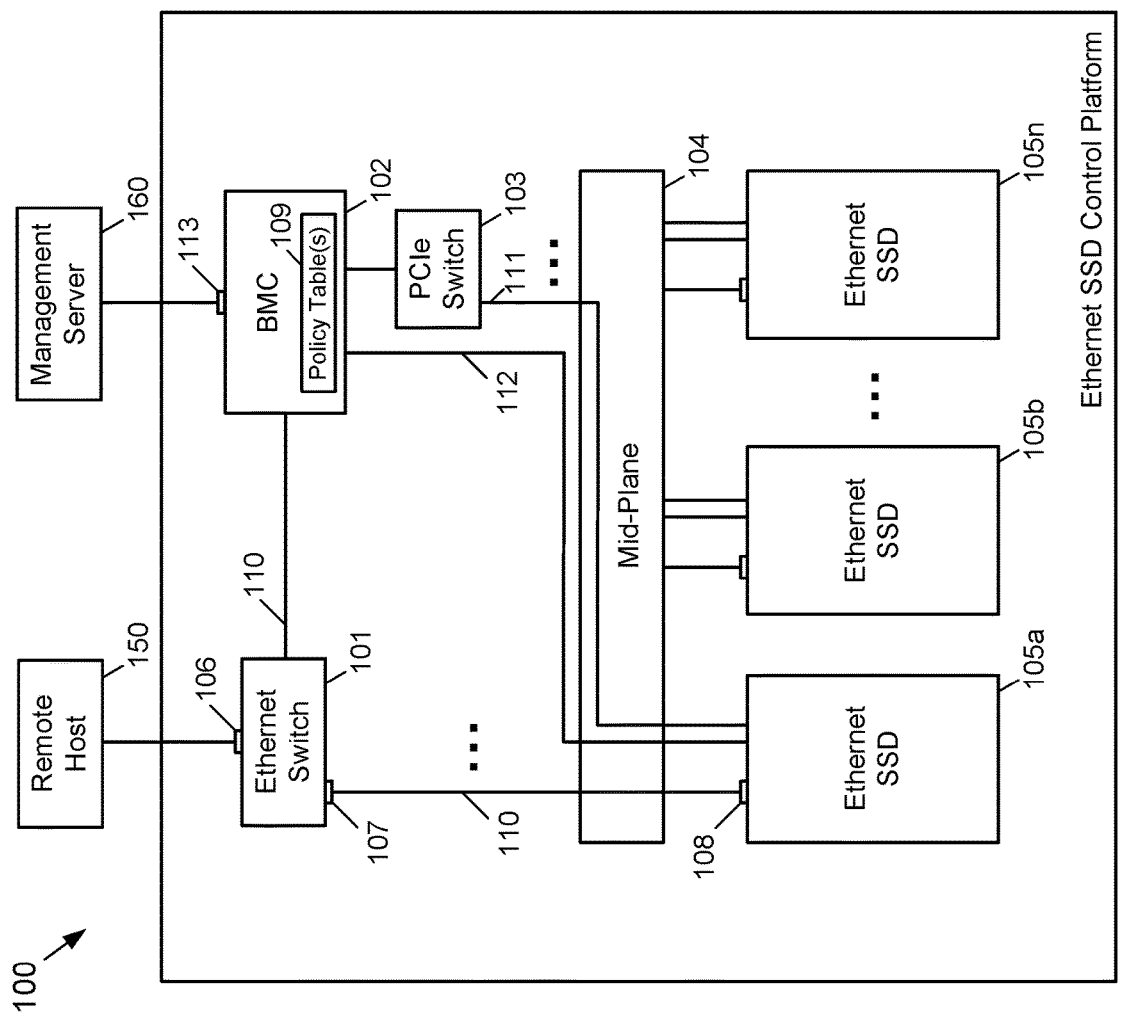
FIG. 1 depicts an eSSD control platform according to the subject matter disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing particular exemplary embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement the teachings of particular embodiments disclosed herein.

Unless otherwise defined, all terms (including technical and scientific terms) used herein have the same meaning as commonly understood by one of ordinary skill in the art to which this subject matter belongs. For example, the term "mod" as used herein means "modulo." It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. The term "software," as applied to any implementation described herein, may be embodied as a software package, code and/or instruction set or instructions. The term "hardware," as applied to any implementation described herein, may include, for example, singly or in any combination, hardwired circuitry, programmable circuitry, state-machine circuitry, and/or firmware that stores instructions executed by programmable circuitry. The modules may, collectively or individually, be embodied as software, firmware and/or hardware that forms part of a larger system, such as, but not limited to, an integrated circuit (IC), system on-chip (SoC) and so forth.

The subject matter disclosed herein provides a system and a technique to enforce one or more bandwidth SLAs by an eSSD control platform in a non-intrusive manner from the point of view of eSSDs in the system. A baseboard management controller (BMC) device in the eSSD control platform may maintain various bandwidth policies for one or more eSSDs connected to the control platform. The BMC device may program, or configure, an Ethernet Switch in the control platform to rate limit uplink ports connected to a host and/or downlink ports connected to the eSSDs. The rate-limiting configurations may be different for an ingress direction (host writes) and for an egress direction (host reads) for each separate eSSD. The rate-limiting configuration of the Ethernet switch may be set in response to commands and/or bandwidth information received from an administrator at a management server; in response to the BMC device enforcing one or more policies contained within the BMC device; or in response to a current health or status of one or more of the eSSDs in the system. As used herein, the term "bandwidth information" may include information relating to an ingress and/or an egress bandwidth that is to be applied to an individual eSSD, a group of eSSDs and/or an entire pool of eSSDs coupled to a control platform.

The BMC device has visibility of all of the SSDs that are present in the system and may monitor their respective parameters and operational status, so intelligent and complex policies may be implemented and monitored that are optimal for an individual eSSD, a subset of all of the eSSDs connected to the system, and/or all of the eSSDs connected to the system. Accordingly, the BMC device does not need to manage multiple proprietary mechanisms of the different SSDs that may be used in a system because the BMC device enforces the SLAs of the system by programming, or configuring, the Ethernet switch, thereby making the SLA bandwidth management independent of the eSSDs in the system. The BMC device also includes a communication path to a storage management server from which a storage administrator may effectively manage the SLAs of a system.

FIG. 1 depicts an eSSD control platform 100 according to the subject matter disclosed herein. In one embodiment, the eSSD control platform 100 may include an Ethernet switch 101, a BMC device 102, a Peripheral Component Interconnect Express (PCIe) switch 103, a mid-plane 104, and one or more eSSDs 105. Although only one Ethernet switch 101 and only one PCIe switch 103 are depicted in FIG. 1 as being part of the eSSD control platform 100, it should be understood that multiple Ethernet switches 101 and multiple PCIe switches 103 may be part of the Ethernet SSD control platform 100. Additionally, the components forming the eSSD control platform 100 may be embodied as separate components or as separate modules. As an alternative, two or more of the components forming the eSSD control platform 100 may be integral with each other.

The eSSD control platform 100 may be physically embodied as a chassis, or as a rack, in which one or more eSSDs 105 may be locally arranged with respect to the control platform 100. One or more additional eSSDs 105 may also be remotely located with respect to the control platform 100. In one embodiment, the control platform 100 may include 24 eSSDs 105. In another embodiment, the eSSD control platform 100 may include 48 eSSDs 105. In still another embodiment, the eSSD control platform 100 may include any number of eSSDs 105.

The Ethernet switch 101 may include a plurality of uplink Ethernet ports 106, of which only one up-link port 106 is depicted in FIG. 1. The uplink ports 106 may connect the Ethernet switch 101 to one or more remote hosts 150, of which only one host 150 is depicted. The Ethernet switch 101 also may include a plurality of downlink Ethernet ports 107, of which only one port 107 is depicted in FIG. 1. The downlink ports 107 may connect the Ethernet switch 101 through the mid-plane 104 to Ethernet ports 108 on individual eSSDs 105. In one embodiment, each eSSD 105 may include an Ethernet port 108. The Ethernet switch 101 may perform rate limiting on the uplink Ethernet ports 106 and/or the downlink Ethernet ports 107. Rate limiting may have three components: packet or frame queueing, scheduling, and flow and congestion control. A Weighted Fair Queueing (WFQ) rate-limiting\component may be used for implementing the queueing sub-systems. Some examples of a scheduling rate-limiting component include a Weighted Round Robin (WRR) technique and a Deficit Round Robin (DRR) technique. A flow and congestion control rate-limiting component may be implemented using, for example, a Tail Drop technique and/or a Weighted Random Early Discard (WRED) technique. In some embodiments, an early congestion notification technique may be used to flow control the traffic. For Ethernet links, pause frames and Priority Flow Control (PFC) standard techniques may be used.

In one embodiment, the BMC device 102 may be located in a main switch board that is part of the Ethernet SSD control platform 100. In another embodiment, the BMC device 102 and the Ethernet switch 101 may be integral with each other.

The BMC device 102 may be configured to provide management functions, such as discovery, configuration, operational status, and health monitoring of each respective eSSDs 105. In one embodiment, the BMC device 102 may include one or more policy tables 109 that may contain information relating to the management functions of, but not limited to discovery, configuration, operational status, and health monitoring of each respective eSSDs 105. The BMC device 102 may use the policy tables 109 to manage and/or enforce one or more SLAs that have been associated with the eSSD control platform 100. In one embodiment, one or more of the SLAs may relate to specific bandwidth policies that the BMC device 102 may enforce. In one embodiment, a bandwidth policy may relate to an individual eSSD 105. In another embodiment, a bandwidth policy may relate to a group of eSSDs 105 that form a subset of all of the eSSDs 105 that are connected to the eSSD control platform 100. In still another embodiment, a bandwidth policy may relate to all of the eSSDs 105 that are connected to the eSSD control platform 100.

In one embodiment of the Ethernet SSD control platform 100, there may be three communication paths between the BMC device 102 and the eSSDs 105 that may be used for obtaining information relating to the management functions provided by the BMC device 102. A first communication path may be over an Ethernet network 110 through the Ethernet switch 101. A second communication path may be over a PCIe bus 111 through the PCIe switch 103 and the mid-plane 104. A third path may be through a System Management Bus (SMBus) 112 that is connected between the BMC device 102 and the eSSDs 105. The BMC device 102 may also have a management port 113 through which a management server 160 that is operated by an administrator (a user) may communicate with and control the BMC device 102. The BMC device 102 may receive bandwidth information for one or more eSSDs 105 that may be used for forming one or more bandwidth policies. The management server 160 may be located in proximity to or remotely from the eSSD control platform 100.

The uplink port 106 of the Ethernet switch 101 that connects to the remote host 150 may be a high-bandwidth link. In one embodiment, the uplink ports 106 of the Ethernet switch 101 may include multiple 40 Gbit/s and/or 100 Gbit/s links. The individual eSSDs 105 typically may have a 10 Gbit/s and/or a 25 Gbit/s Ethernet port 108. The individual eSSDs 105 in the eSSD control platform 100 may be oversubscribed for the higher bandwidth of an uplink port 106 of the Ethernet switch 102. Such an oversubscription of bandwidth is possible because generally not all eSSDs 105 are active at the same time. The amount of Ethernet bandwidth consumed by a particular eSSD 105 depends upon the workload submitted to that eSSD by the remote host 150.

In one embodiment, the workload submitted by a remote host 150 may use a protocol that is based on the Non-Volatile Memory Express over Fabrics (NVMe over Fabrics) specification to send read/write IO commands to the eSSDs 105. Accordingly, the amount of bandwidth consumed by an eSSD 105 at any time depends upon the number of I/O commands that have been submitted and the data transfer size of those commands. For host write commands, an eSSD 105 transfers user data from the remote host 150 to the local media of an eSSD 105 and, in so doing, consumes Ethernet ingress bandwidth. For host read commands, an eSSD 105 transfers user data from the local media of the eSSD 105 to the remote host 150, thus consuming Ethernet egress bandwidth.

Each eSSD 150 may include a predetermined number of command submission queues (SQ). An eSSD 105 may perform arbitration to serve the queues. After selecting a SQ, the eSSD 105 fetches the next command for execution from the selected SQ. As part of the command execution, the eSSD 105 performs the specified data transfer to or from the remote host 150. Once the data transfer has been completed, the eSSD 105 may send a completion message to the remote host 150. At that point, the eSSD 105 returns to the SQ arbitration, and so on. The eSSD 105 continues to cycle through a command execution loop that arbitrates the SQs as long as there are pending commands in the SQs.

The BMC device 102 may use one or more policy tables 109 to manage and/or enforce one or more SLAs that have been associated with the eSSD control platform 100. An SLA may relate to specific bandwidth policies that are applied to one or more of the eSSDs 105 in the control platform 100. A bandwidth policy may be based on one or more aspects, such as, but not limited to, temporal aspects (time of day, day of week, etc.), eSSD operating parameters, eSSD power consumption, Flash-media technology, a user subscription rate, a cost of utility rate (i.e., weekday vs. holiday or weekend), and/or a promotional arrangement of a service provider. Information obtained from an eSSD by a Vital Product Data (VPD) read may be stored locally at the BMC device 102 and used to adaptively control a bandwidth SLA. In one embodiment, the status and/or parameters of the eSSDs 105 may be read by the BMC device 102 using a NVMe Management Interface (NVMe-MI) based protocol running over the SMBus and/or PCIe interface.

FIGS. 2A-2C respectively depict example policy tables for managing and/or enforcing Ethernet ingress and egress bandwidth (B/W) according to the subject matter disclosed herein. FIG. 2A depicts an example policy table 109a for Ethernet ingress and egress B/W SLAs for a plurality of eSSDs in which the Ethernet ingress and egress B/W SLAs are identical for each of the eSSDs in the table. In particular, each eSSD has an ingress B/W SLA of 5 Gbps and an egress B/W SLA of 10 Gbps. FIG. 2B depicts another example policy table 109b for Ethernet ingress and egress B/W SLAs for a plurality of eSSDs in which the Ethernet ingress and egress B/W SLAs are different for each of the eSSDs in the table. FIG. 2C depicts yet another example policy table 109c for Ethernet ingress and egress B/W SLAs for a plurality of eSSDs in which the Ethernet ingress and egress B/W SLAs are identical for different groups of the eSSDs in the table. In particular, eSSD-0 and eSSD-1 as a first group both have an ingress B/W SLA of 5 Gbps and an egress B/W SLA of 5 Gbps; whereas eSSD-2 through eSSD-n as a second group each have an ingress B/W SLA of 5 Gbps and an egress B/W SLA of 10 Gbps.

Figure 3:
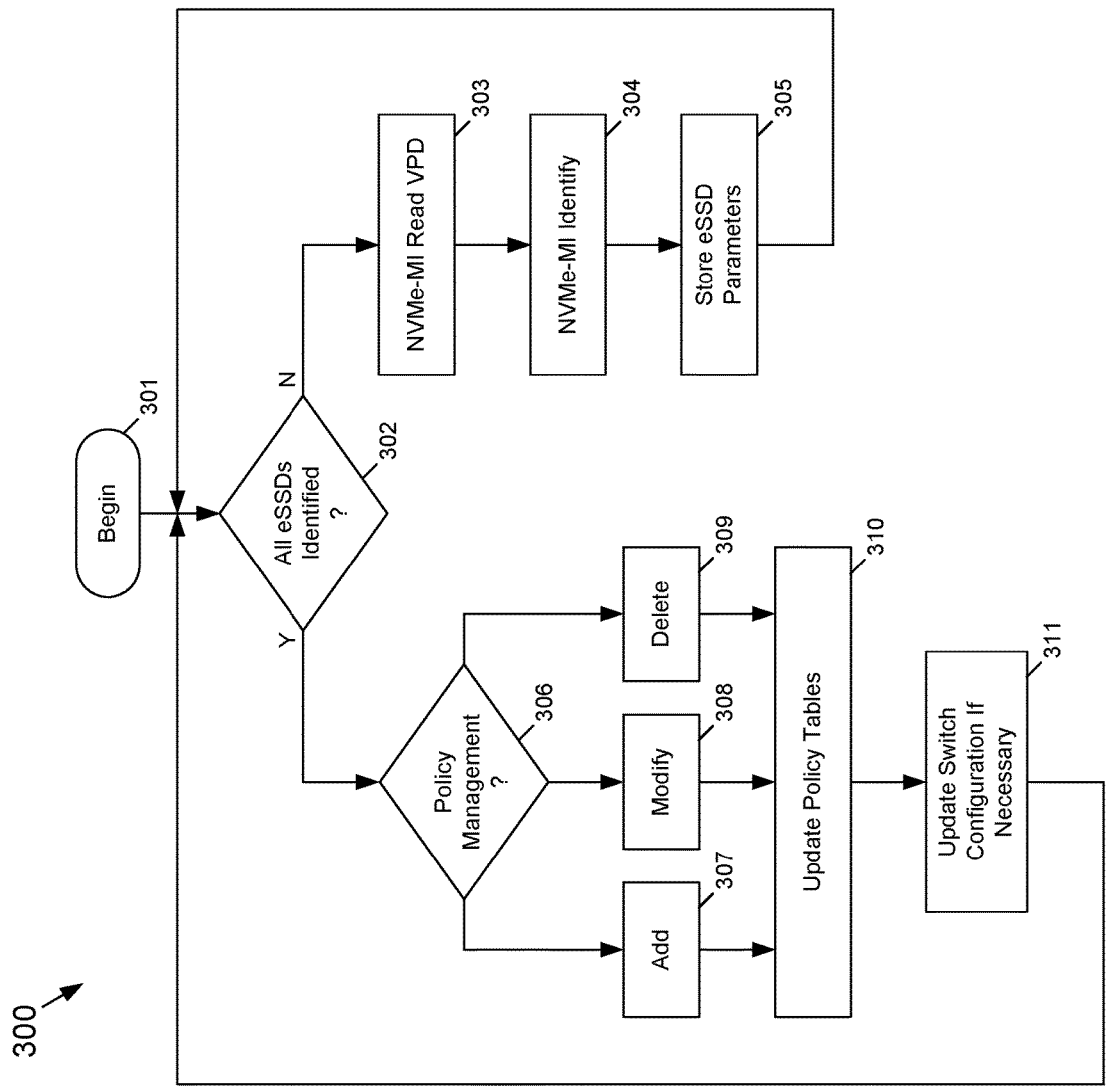
FIG. 3 depicts a flow diagram of an example embodiment of a process for initializing SLA policy enforcement according to the subject matter disclosed herein.

FIG. 3 depicts a flow diagram of an example embodiment of a process 300 for initializing SLA policy enforcement according to the subject matter disclosed herein. That is, the process 300 may be a process that a BMC performs at power up or at system reset to identify eSSDs in the system and to initially configure one or more SLAs. At 301, the process begins. At 302, the BMC determines whether all eSSDs in the system have been identified. If not, flow continues to 303 where the BMC reads VPD through an NVMe-MI of an eSSD. The VPD may include, but is not limited to, a common header, product information, multirecord information, internal use information, a chassis information area and a board specific area. At 304, the BMC identifies the eSSD based on the VPD. At 305, the BMC locally stores the eSSD parameters for the eSSD. Flow returns to 302 until all eSSDs in the platform have been identified and VPD corresponding to each eSSD has been locally stored.

If, at 302, all eSSDs in the platform have been identified, flow continues to 306 where the BMC determines whether an SLA policy is to be added, modified or deleted from a policy management table. If an SLA policy is to be added, flow continues to 307 and to 310 where a policy is added to a policy management table. If an SLA policy is to be modified, flow continues to 308 and to 310 wherein policy is modified in a policy management table. If an SLA policy is to be deleted, flow continues to 309 and to 310 where a policy is deleted from an SLA policy table. Some reasons for a policy change at system power up or at system reset may be because one or more new eSSDs may be added to the plurality of eSSDs 105, one or more eSSDs previously existing the plurality of eSSDs 105 may be removed, and or one or more eSSDs previously existing the plurality of eSSDs 105 may have become non-operational. Events such as, but not limited to these events may cause different policies to become active. Additionally, eSSD characteristics, such as Bit Error Rate (BER), operating temperature, storage capacity, etc., may change over time and thereby cause a need for a policy change. Further, one or more eSSDs 105 may be reassigned to different hosts and/or applications over time, which may result in a need for policy change. Still another example that may cause a policy change may involve multiple policies that are applied at different times, e.g., daytime vs nighttime or weekday vs weekend.

Flow then continues to 311 where the configuration of the Ethernet switch 101 is updated based on the update to the policy table at 310. Flow returns to 302. If at 306, no SLA policy is to be added, modified or deleted, flow returns (not shown) to 302.

Figure 4:
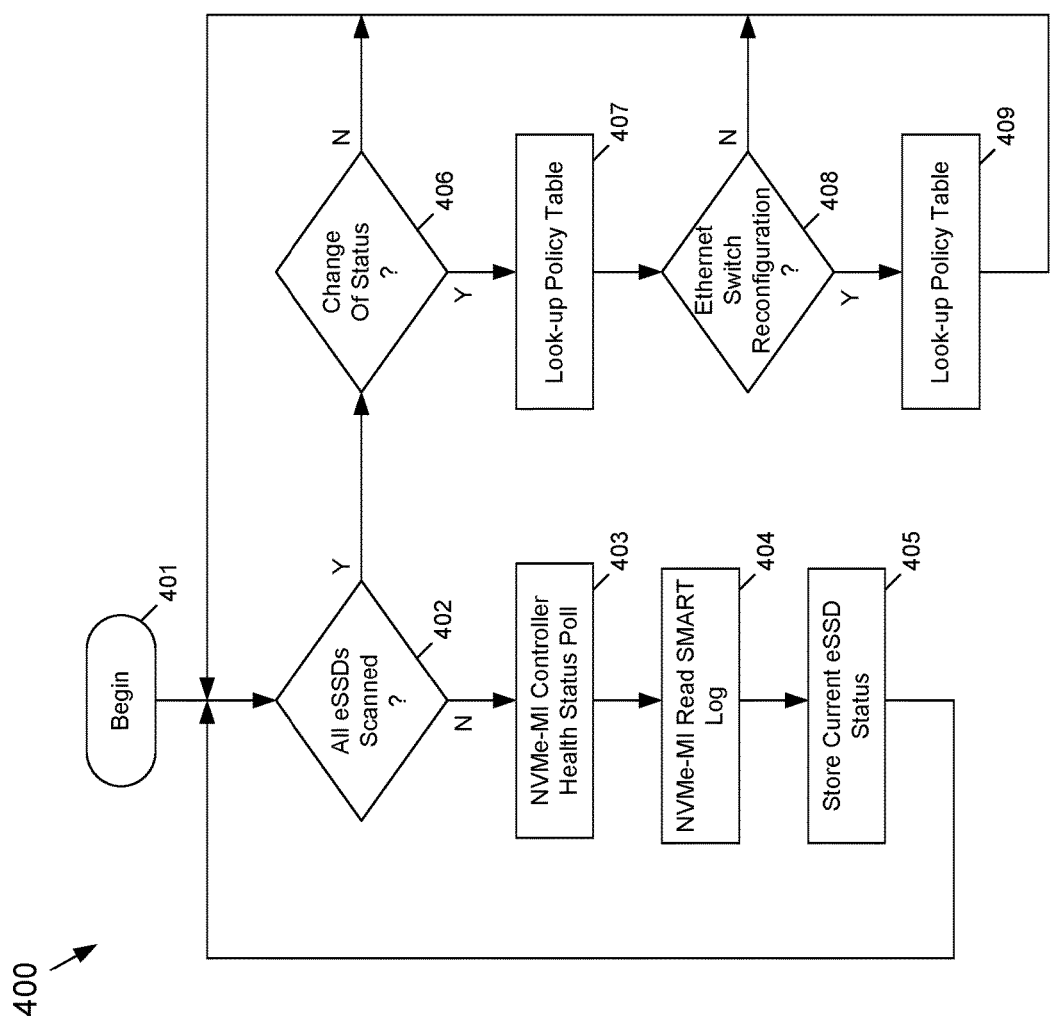
FIG. 4 depicts a flow diagram of an example embodiment of a process for monitoring the status of eSSDs and modifying a policy table based on the status of eSSDs according to the subject matter disclosed herein.

FIG. 4 depicts a flow diagram of an example embodiment of a process 400 for monitoring the status of eSSDs and modifying a policy table based on the status of eSSDs according to the subject matter disclosed herein. The process begins at 401. Flow continues to 402 where the BMC determines whether the (health) status of all eSSDs in the system has been scanned. If not, flow continues to 403 where the (health) status of a first eSSD that has not been scanned is scanned using, for example, a NVMe-MI health status poll. At 404, the BMC reads the SMART/Health Information log of the eSSD. At 405, the BMC locally stores the current health status of the eSSD. Flow returns to 402.

If, at 402, the BMC has scanned the health status of all eSSDs in the system, flow continues to 406 where the BMC determines whether there has been a change of health status for any of the eSSDs. The health status parameters of an eSSD that may be monitored by the BMC may include, but are not limited to a data structure within the eSSD, an operating temperature, media integrity (i.e., BER), remaining life, available spare capacity, total capacity, used capacity, amount of data read/written since a predetermined time, a number of host commands responded to since a predetermined time, drive writes per day (DWPD), eSSD controller busy time, and any proprietary information.

If at 406, no changes of health status for any of the eSSDs have been determined or detected, flow returns to 402. If, at 406, there has been a change of health status for any of the eSSDs, flow continues to 407 where the BMC accesses a policy table relating to the health status of the affected eSSD. Other reasons for that policy change may be determined to be needed at 406 may include that one or more new eSSDs may be added (i.e., hot swapped) to the plurality of eSSDs 105, one or more eSSDs previously existing the plurality of eSSDs 105 may be removed (i.e., hot swapped), and or one or more eSSDs previously existing the plurality of eSSDs 105 may have become non-operational. Events such as, but not limited to these events may cause different policies to become active. Additionally, as mentioned eSSD characteristics, such as BER, operating temperature, storage capacity, etc., may change over time and thereby cause a need for a policy change. Further, one or more eSSDs 105 may be reassigned to different hosts and/or applications over time, which may result in a need for policy change. Still another example that may cause a policy change at 406 may involve multiple policies that are applied at different times, e.g., daytime vs nighttime or weekday vs weekend.

At 408, it is determined based on the change of health status for the eSSD and the contents of the policy table relating to the health status of the eSSD whether the Ethernet switch should be reconfigured. If not, flow returns to 402. If the Ethernet switch should be reconfigured, flow continues to 409 where the BMC reprograms the Ethernet switch to an updated configuration.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A system, comprising:
   at least one Ethernet solid-state drive (eSSD);
   an Ethernet switch coupled to an Ethernet port of the at least one eSSD; and
   a controller coupled to the at least one eSSD and the Ethernet switch, wherein the controller comprises a baseboard management controller, the controller configured to:
   store, in a policy data structure of the controller, bandwidth information for the eSSD in a policy table; and
   program the Ethernet switch to provide a predetermined bandwidth to the eSSD by rate limiting user data transfers through the Ethernet switch, wherein the predetermined bandwidth is based on a bit error rate and a temperature associated with the eSSD;
   wherein the Ethernet switch is configured to rate limit user data transfers to the eSSD through the Ethernet switch.

2. The system of claim 1, wherein the predetermined bandwidth for the eSSD comprises a predetermined ingress bandwidth and a predetermined egress bandwidth for the eSSD.

3. The system of claim 2, wherein the predetermined bandwidth is based on a service level associated with the eSSD.

4. The system of claim 3, wherein the predetermined bandwidth is adaptively based on operating parameters of the eSSD.

5. A method comprising:
   receiving, at a controller, bandwidth information for at least one Ethernet solid-state drive (eSSD) of a plurality of eSSDs;
   storing, in a policy data structure of the controller, the received bandwidth information for the eSSD, wherein the controller comprises a baseboard management controller;

configuring, by the controller, a bandwidth capacity of an Ethernet switch for the eSSD by programming the Ethernet switch based on the bandwidth information for the eSSD, the Ethernet switch being coupled to an Ethernet port of the eSSD, wherein the bandwidth capacity for the eSSD is based on a bit error rate and a temperature associated with the eSSD; and rate limiting user data transfers between the Ethernet switch and the eSSD based on the bandwidth information for the eSSD;

wherein the rate limiting is performed, at least in part, by the Ethernet switch.

6. The method of claim 5, wherein the bandwidth capacity is based on a service level associated with the eSSD.

7. The method of claim 6, wherein the bandwidth capacity is adaptively based on operating parameters of the eSSD.

8. A method comprising:

receiving, at a controller for an Ethernet solid state drive (eSSD), bandwidth information for the eSSD;

storing, in a policy data structure of the controller, the bandwidth information for the eSSD;

transferring data between a host and the eSSD through an Ethernet switch coupled to an Ethernet port of the eSSD; and configuring the Ethernet switch to rate limit user data transfers, based on the bandwidth information and a bit error rate and a temperature associated with the eSSD, between the host and the eSSD;

wherein the controller comprises a baseboard management controller;

wherein the Ethernet switch is configured by the controller; and wherein the rate limiting is performed, at least in part, by the Ethernet switch.

9. The method of claim 8, wherein the controller configures the Ethernet switch based on commands received from an administrator.

10. The method of claim 8, wherein:

the controller receives the bandwidth information for the eSSD from an administrator.

11. The method of claim 8, wherein:

the controller monitors one or more conditions of the eSSD; and the controller configures the Ethernet switch based on the one or more conditions.

12. The method of claim 8, wherein the Ethernet switch is configured to rate limit user data transfers between the host and the eSSD by queuing.

13. The method of claim 8, wherein the Ethernet switch is configured to rate limit user data transfers between the host and the eSSD by scheduling.

14. The method of claim 8, wherein the Ethernet switch is configured to rate limit user data transfers between the host and the eSSD by flow control.

* * * * *